United States Patent [19]

Tsuboi

[11] Patent Number: 4,462,482
[45] Date of Patent: * Jul. 31, 1984

[54] MOTORIZED TWO-WHEELED VEHICLE

[75] Inventor: Masaharu Tsuboi, Tokorozawa, Japan

[73] Assignee: Honda Giken Kogyo Kabushiki Kaisha, Tokyo, Japan

[*] Notice: The portion of the term of this patent subsequent to May 25, 1999 has been disclaimed.

[21] Appl. No.: 350,350

[22] Filed: Feb. 19, 1982

Related U.S. Application Data

[63] Continuation of Ser. No. 101,110, Jun. 11, 1979, Pat. No. 4,331,212.

[30] Foreign Application Priority Data

Sep. 25, 1977 [JP] Japan .................. 52-143214
Sep. 29, 1977 [JP] Japan .................. 52-129232

[51] Int. Cl.$^3$ .............................. B60K 5/04
[52] U.S. Cl. .................. 180/230; 74/15.84; 123/54 A; 123/179 R
[58] Field of Search ......... 180/219, 230; 74/15.84; 123/54 A, 52 A, 52 MC, 179 R, 179 D, 179 BG

[56] References Cited

U.S. PATENT DOCUMENTS

| | | | |
|---|---|---|---|
| 1,986,066 | 1/1935 | Marski | 123/52 R |
| 3,227,236 | 1/1966 | Burton | 180/230 |
| 4,165,728 | 8/1979 | Matsumoto | 180/219 |
| 4,331,212 | 5/1982 | Tsuboi | 180/230 |

FOREIGN PATENT DOCUMENTS

| | | |
|---|---|---|
| 5135603 | 9/1969 | Japan . |
| 49-44442 | 4/1974 | Japan . |
| 567646 | 2/1945 | United Kingdom . |
| 1333203 | 10/1973 | United Kingdom ........ 123/179 SE |

OTHER PUBLICATIONS

Motorcyclist, Apr. 1962, pp. 4–28, "Engine of the Month".
Motorcyclist, Feb. 1969, pp. 1–3, 8–10.
Autobicycle, Sep., 1969, pp. 42–49.

*Primary Examiner*—John A. Pekar
*Assistant Examiner*—D. Lynn Fugate
*Attorney, Agent, or Firm*—Armstrong, Nikaido, Marmelstein & Kubovcik

[57] ABSTRACT

A motorcycle of such a type that a vehicle body frame is provided thereon with an internal combustion engine 4 in front and a transmission 5 in rear. An intermediate driving shaft 18 is interposed between a crankshaft 8 of the engine 4 and an input shaft 13 of the transmission 5. The driving shaft 18 is provided at its both end portions with an A.C. generator 19 and a control member 20 for an ignition circuit, for instance, a pulse generator or a contact breaker. According to this arrangement, even in the case where the engine is of a multiple cylinder type and the crankshaft is comparatively large in length, the motorcycle is prevented from becoming remarkably large in width locally at its crankshaft portion.

5 Claims, 4 Drawing Figures

MOTORIZED TWO-WHEELED VEHICLE

This is a continuation of application Ser. No. 101,110, filed June 11, 1979, now U.S. Pat. No. 4,331,212.

DESCRIPTION

1. Technical Field

This invention relates to a motorized two-wheeled vehicle such as a motorcycle or the like chiefly of such a type that an internal combustion engine thereof is a multiple cylinder engine such as of 4 cylinders, 6 cylinders or the like.

2. Background Art

There has been hitherto known, with this kind of two-wheeled vehicle, such a type one that a vehicle body frame having a front wheel and a rear wheel is provided thereon with an internal combustion engine in front and a transmission in rear so that an output of the engine may be transmitted through the transmission to the rear wheel. It has been usual, in this case, that a crankshaft on the bottom portion of the engine is provided on its right and left end portions with an A.C. generator and a control member for an ignition circuit, for instance, a pulse generator or a contact breaker. This arrangement, however, is attended with the following inconvenience especially where the engine is constructed to be of such a multiple cylinder type that plural ones, for instance, 6 ones of a cylinder extending nearly vertically are disposed laterally.

Namely, in this case, there is caused such an inconvenience that the crankshaft per se becomes comparatively large in length laterally, and the A.C. generator and the control member as mentioned above on its both end portions act to further increase the length thereof, and thus the two-wheeled vehicle is remarkably increased in width locally and the appearance thereof tends to be injured.

DISCLOSURE OF THE INVENTION

This invention has for its object to provide a motorized two-wheeled vehicle which is free from the foregoing inconvenience, and in such a type of vehicle that a vehicle body frame having a front wheel and a rear wheel is provided thereon with an internal combustion engine in front and a transmission in rear so that an output of the engine may be transmitted through the transmission to the rear wheel, it is characterized in that an intermediate driving shaft is provided laterally between a laterally extending crankshaft on the bottom portion of the engine and a laterally extending input shaft at the front portion of the transmission so that rotation of the crankshaft may be transmitted through the intermediate driving shaft to the input shaft, and an A.C. generator and a control member for an ignition circuit, for instance, a pulse generator or a contact breaker are provided on both end portions of the intermediate driving shaft.

Thus, according to this invention, the intermediate driving shaft is interposed between the crankshaft of the engine and the input shaft of the transmission in the rear thereof, and the A.C. generator and the control member for the ignition circuit are disposed on both end portions thereof, so that this invention has such advantageous effects that the foregoing inconvenience of the conventional arrangement in which the A.C. generator and the control member are disposed on both end portions of the crankshaft can be removed, and thus especially in the case where the same is applied to such a case that the engine is a multiple cylinder type one and accordingly the crankshaft is laterally long there can be obtained such a vehicle that the whole thereof is comparatively small in width and the appearance thereof is excellent.

In this case, it is desirable that the A.C. generator and the control member for the ignition circuit as mentioned before which are electric parts are provided at comparatively high positions together with a starter motor which is also an electric part, and thus those are protected from rain water or the like from the surface of the earth.

This invention has for its other object to provide a motorized two-wheeled vehicle satisfying this requirement, and it is characterized in that, in the foregoing arrangement, the driving shaft is so provided as to be positioned higher than the crankshaft, and there is provided to be positioned in the rear thereof and at nearly the same level therewith a starter motor connected to a starter gear on the driving shaft.

Thus, according to this invention, the intermediate driving shaft between the crankshaft and the input shaft of the transmission is positioned higher than the crankshaft, so that the electric parts on its both end portions, namely, the A.C. generator and the control member for the ignition circuit can be given a large level above the surface of the earth and thus can be effectively protected from rain water or the like from the earth surface, and additionally the starter motor which is another electric part can be also positioned at nearly the same level therewith above the earth surface and thus can be also protected from rain water or the like, and thus troubles of the electric parts can be remarkably decreased and the appearance can become good.

BEST MODE FOR CARRYING OUT THE INVENTION

Figure 1:
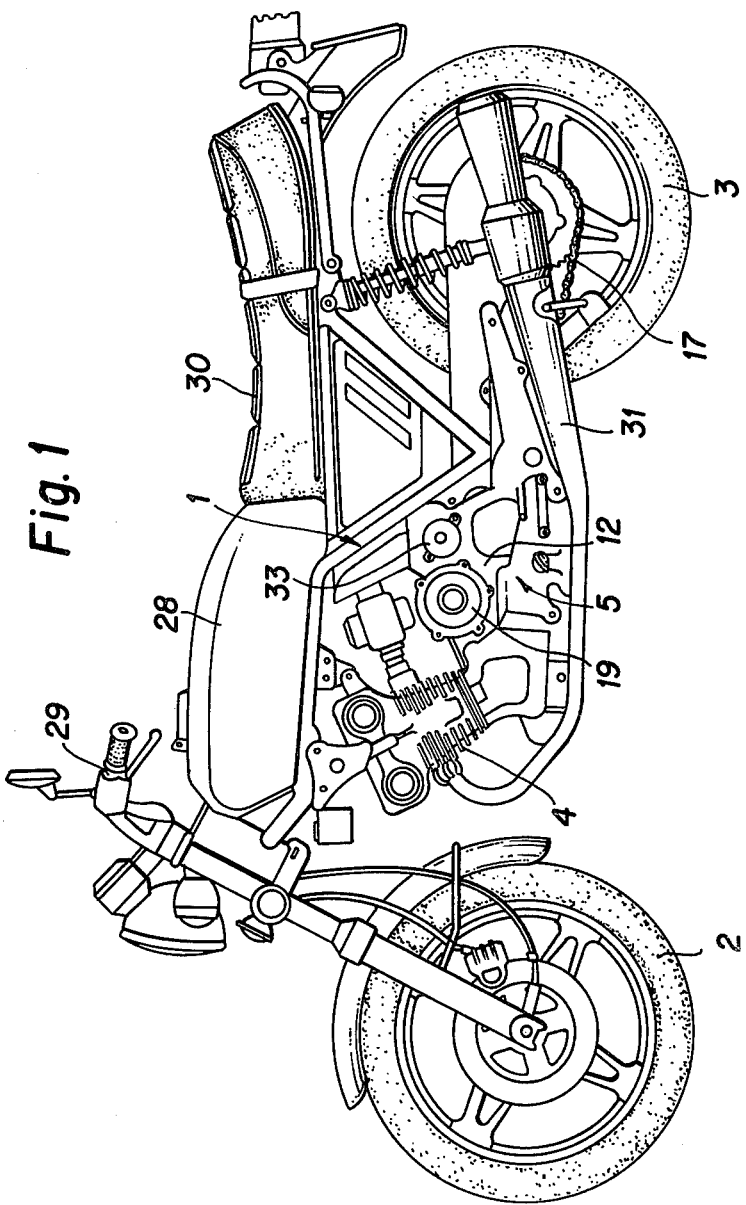
FIG. 1 is a side view of one example of this invention two-wheeled vehicle.
Figure 2:
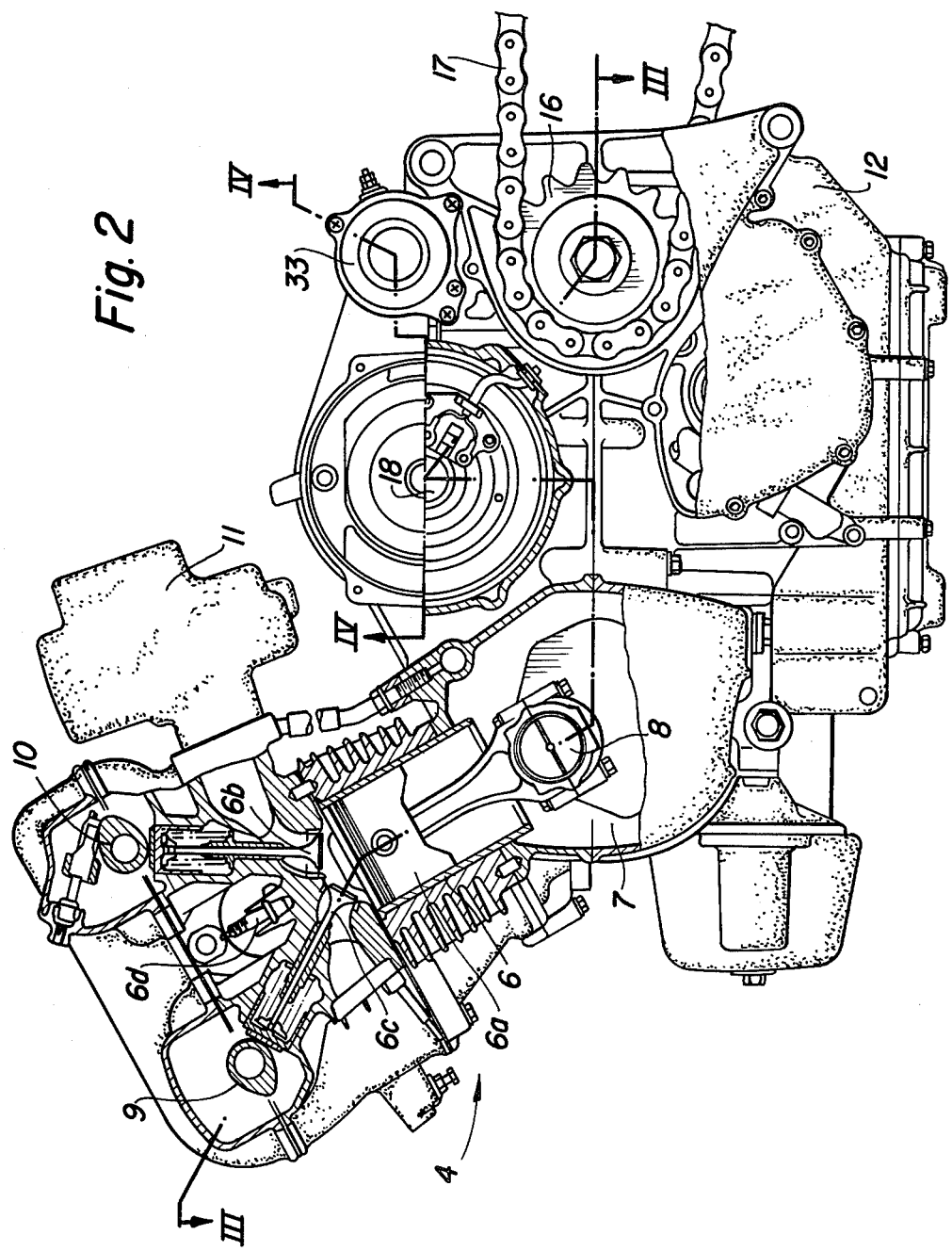
FIG. 2 is an enlarged side view, partly in section, of an important section thereof.
Figure 3:
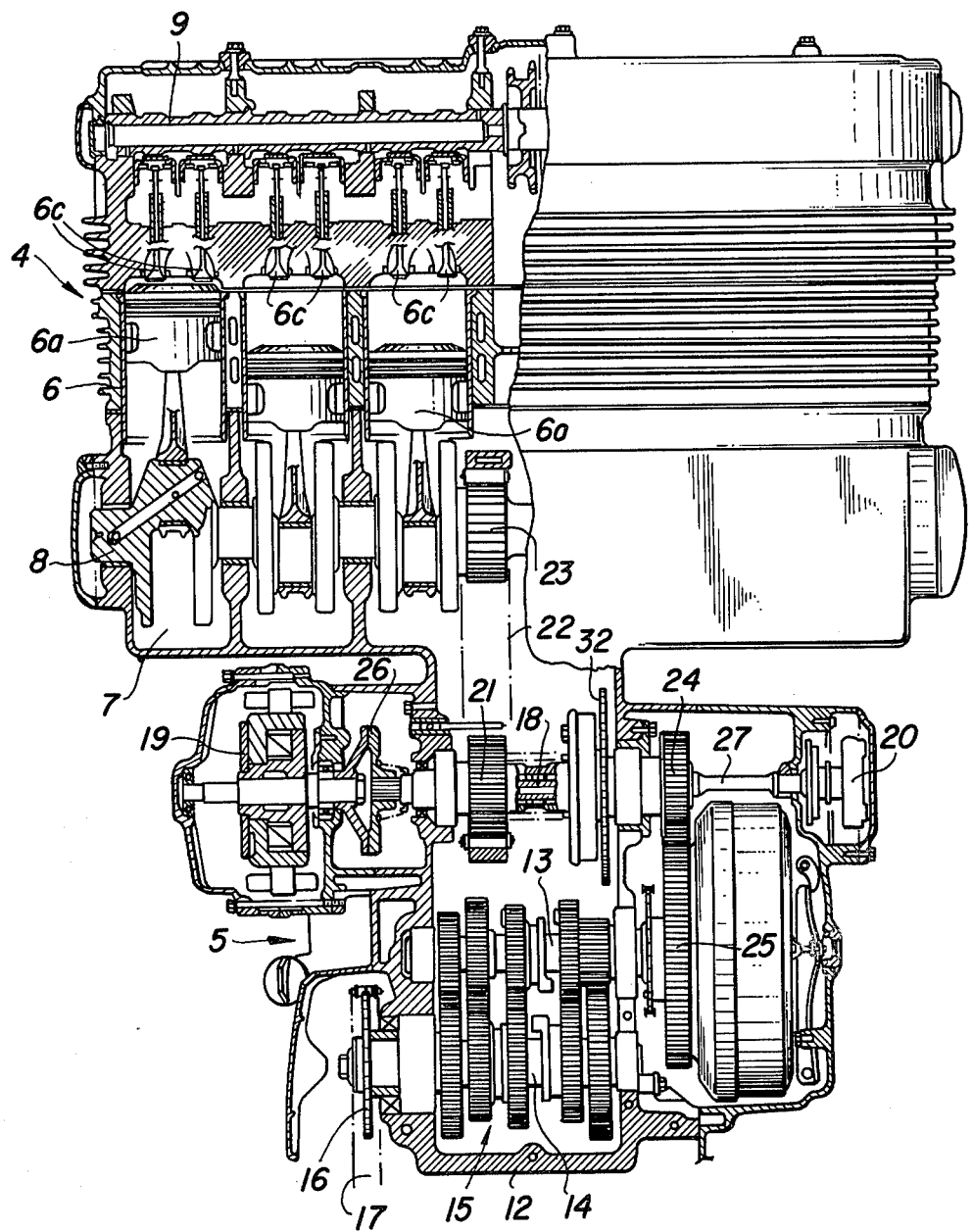
FIGS. 3 and 4 are sectional views taken along the lines III—III and IV—IV in FIG. 2.
Figure 4:
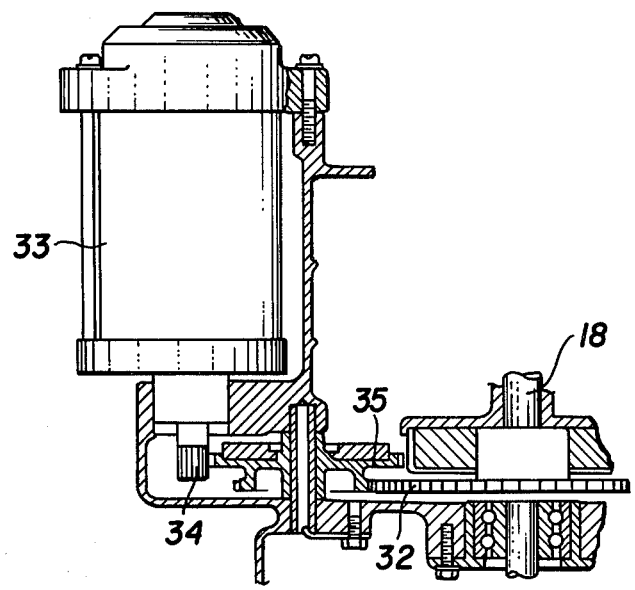

One embodying example of this invention will be explained with reference to the accompanying drawings.

Referring to the drawings, numeral 1 denotes a vehicle body frame of a motorcycle, and numerals 2, 3 denote a front wheel and a rear wheel of the same, and the vehicle body frame 1 is provided at its front portion with an internal combustion engine 4 and at its rear portion with a transmission 5 so that an output of the engine 4 may be transmitted through the transmission 5 to the rear wheel 3.

The engine 4 is constructed into such a 6 cylinder engine that six cylinders 6, each extending nearly vertically, are disposed laterally, and the same has a crankshaft 8 extending laterally in a crank chamber 7 on its lower side.

Referring to the drawings, numerals 9, 10 denote a pair of front and rear valve driving cam shafts on the upper side thereof, and numeral 11 denotes a carburetor on the rear side thereof, and six carburetors 11 are disposed laterally.

Each cylinder 6, as in a known manner, has therein a piston 6a and has on its upper side a pair of intake valves 6b, 6b and a pair of exhaust valves 6c, 6c. Referring to the drawings, numeral 6d denotes an ignition plug.

The transmission 5 is so constructed that an input shaft 13 on its front side and an output shaft 14 on its rear side are provided in parallel one with another in an outer surrounding transmission casing 12, and is of such a type that the two shafts 13, 14 are interconnected through selectable plural gear trains 15, and the same is connected at a sprocket 16 on an outer end of the output shaft 14 to the rear wheel 3 through a chain 17.

The foregoing arrangement is not especially different from that in the conventional vehicle. According to this invention, an intermediate driving shaft 18 is provided laterally between the crankshaft 8 and the input shaft 13 of the transmission 5 so that an output of the crankshaft 8 may be transmitted through the intermediate driving shaft 18 to the input shaft 13, and additionally an A.C. generator 19 and a control member 20 for an ignition circuit, for instance, a pulse generator or a contact breaker are disposed on right and left end portions of the intermediate driving shaft 18. In this case, the driving shaft 18 is comparatively shortened in length so that the total length thereof including the members 19, 20 on its both end portions may be within the length of the crankshaft 8. The control member 20 comprises the pulse generator in the case where the ignition circuit is of a non-contact type, and the same comprises the contact breaker in the case where the circuit is of a contact type.

More in detail, the intermediate driving shaft 18 has at its middle portion a sprocket 21, and the sprocket 21 is in engagement through a chain 22 with a sprocket 23 on the middle portion of the crankshaft 8, and additionally the same has on one side thereof a driving gear 24, and the gear 24 is in engagement with an input gear 25 on one end portion of the input shaft 13, so that by rotation of the crankshaft 8, the intermediate driving shaft 18 and additionally the input shaft 13 through the shaft 18 can be rotated together. In the illustrated embodiment, the intermediate driving shaft 18 comprises a tubular shaft, and the generator 19 is connected through a friction clutch 26 to one end portion thereof, and a shaft 27 is extended from the other end portion thereof and the pulse generator serving as the control member 20 is provided thereon.

The A.C. generator 19 comprises a rotor and a starter as in a known manner, and the same is connected at its rotor to the driving shaft 18. Further, it is also the case with the control member 20 and the same is connected at its rotor to the driving shaft 18. In the case where the member 20 is the pulse generator as mentioned before, it is so arranged that a pulse signal generated therefrom may be led to a switching element in the ignition circuit.

The operation of the above arrangement will now be explained as follows:

If the engine 4 is operated, the crankshaft 8 is rotated, and in conjunction therewith the intermediate driving shaft 18 and through the same the input shaft 13 of the transmission 5 are rotated together, so that the rear wheel 3 is driven through the output shaft 14 of the transmission 5 and running of the motorcycle is given, and in the meanwhile the A.C. generator 19 and the control member 20 for the ignition circuit are given rotation through the driving shaft 18 for being operated together. Referring to the drawings, numeral 28 denotes a fuel tank above the engine 4, numeral 29 denotes a steering handle in front of the same, numeral 30 denotes a driver's seat in the rear, and numeral 31 denotes a muffler extending rearwards from the engine 4.

According to this invention, additionally, as mentioned before, the intermediate driving shaft 18 is so provided as to be positioned higher than the crankshaft 8, and a starter motor 33 connected to a starter gear 32 on the shaft 18 is so provided as to be positioned in the rear thereof and at almost the same level therewith.

More in detail, the starter motor 33 is so provided as to be positioned upward of the output shaft 14, and a gear 34 on its output side is in engagement through an intermediate gear 35 with the starter gear 32 on the driving shaft 18 so that the motor 33 may serve, as occasion demands, to operate the crankshaft 8 through the driving shaft 18 for giving a starting operation to the engine 4. Consequently, the A.C. generator 19 and the control member 20 for the ignition circuit which are both electric parts, and the starter motor 33 which is also an electric part are all becoming large in height above the earth surface and can be prevented from rain water or the like from the earth surface.

I claim:

1. A motorized two-wheeled vehicle comprising a vehicle body frame having a front wheel and a rear wheel, an approximately vertically extending multiple-cylinder internal combustion engine positioned adjacent said front wheel and having a crankcase, and a bottom portion, a transmission positioned rearwardly of said engine and driven thereby, said transmission having an output shaft operatively coupled to drive said rear wheel and a casing formed integrally with said crankcase of said engine, a laterally extending crank shaft having a given width in the bottom portion of said engine and having a middle portion, a laterally extending input shaft on a front portion of said transmission, a laterally extending intermediate shaft constituting a driving shaft for said input shaft incorporated between said crank shaft and said input shaft and located above said crank shaft, said intermediate shaft having end portions and a middle portion, power transmission means interconnecting said crank shaft and said intermediate shaft, and an A.C. generator provided on one end portion of said intermediate shaft, said intermediate shaft and said A.C. generator having a total length within the width of said crank shaft.

2. The motorized two-wheeled vehicle of claim 1, further comprising a starter motor operatively coupled for starting said engine positioned to be substantially at the same level as said A.C. generator.

3. The motorized two-wheeled vehicle of claim 1, a starter gear on said intermediate shaft, an intermediate gear engaged with said starter gear, and a starter motor positioned above said output shaft having an output gear engaged with said intermediate gear.

4. The motorized two-wheeled vehicle of claim 1, wherein the intermediate shaft is used as a power train means for said input shaft of said transmission.

5. The motorized two-wheeled vehicle of claim 1, wherein said power transmission means includes a chain interconnecting said middle portion of said intermediate shaft and said middle portion of said crankshaft.

* * * * *

REEXAMINATION CERTIFICATE (540th)
United States Patent [19]
Tsuboi

[11] B1 4,462,482
[45] Certificate Issued * Jul. 22, 1986

[54] MOTORIZED TWO-WHEELED VEHICLE

[75] Inventor: Masaharu Tsuboi, Tokorozawa, Japan

[73] Assignee: Honda Giken Kogyo Kabushiki Kaisha, Tokyo, Japan

Reexamination Request:
No. 90/000,887, Oct. 15, 1985

Reexamination Certificate for:
Patent No.: 4,462,482
Issued: Jul. 31, 1984
Appl. No.: 350,350
Filed: Feb. 19, 1982

[ * ] Notice: The portion of the term of this patent subsequent to May 25, 1999 has been disclaimed.

Related U.S. Application Data

[63] Continuation of Ser. No. 101,110, Jun. 11, 1979, Pat. No. 4,331,212.

[30] Foreign Application Priority Data

Sep. 25, 1977 [JP] Japan ............... 52-143214
Sep. 29, 1977 [JP] Japan ............... 52-129232

[51] Int. Cl.⁴ .............................................. B60K 5/04
[52] U.S. Cl. .................................... 180/230; 74/15.84; 123/54 A; 123/179 R; 123/198 R
[58] Field of Search ............... 180/219, 230; 74/15.84; 123/198 R, 54 A, 52 A, 52 MC, 179 R, 179 D, 179 BG

[56] References Cited
U.S. PATENT DOCUMENTS 1,986,066  1/1935  Marski ............................ 123/52 A
3,227,236  1/1966  Burton ............................ 180/230
4,165,728  8/1979  Matsumoto ..................... 180/219

FOREIGN PATENT DOCUMENTS 49-44442  4/1974  Japan .
567646  2/1945  United Kingdom .
1333203  10/1973  United Kingdom ......... 123/179 SE

OTHER PUBLICATIONS

German periodical "Das Motorrad", No. 8/1974, pp. 8-10 (Das Motorrad tested Honda CB 500).
German periodical "Das Motorrad", No. 23/1974, pp. 42-49 (Das Motorrad compares Honda CB 500 and Benelli 500).
German periodical "Das Motorrad", No. 9/1975, pp. 68-74 (Benelli SEI Dissected).
German technical text *SCHNELLE MOTOREN* by Helmut Hutten, 4th edition, 1963, publishing house K. Schmidt, Braunschweig, pp. 416-417.

*Primary Examiner*—Pekar John A.

[57] ABSTRACT

A motorcycle of such a type that a vehicle body frame is provided thereon with an internal combustion engine 4 in front and a transmission 5 in rear. An intermediate driving shaft 18 is interposed between a crankshaft 8 of the engine 4 and an input shaft 13 of the transmission 5. The driving shaft 18 is provided at its both end portions with an A.C. generator 19 and a control member 20 for an ignition circuit, for instance, a pulse generator or a contact breaker. According to this arrangement, even in the case where the engine is of a multiple cylinder type and the crankshaft is comparatively large in length, the motorcycle is prevented from becoming remarkably large in width locally at its crankshaft portion.

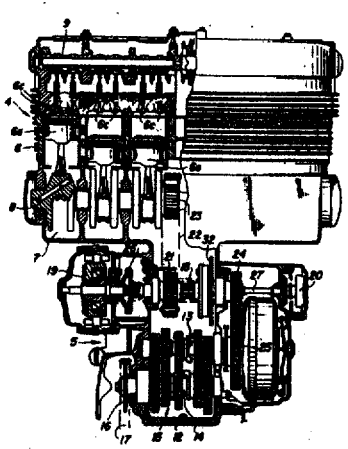

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *